United States Patent [19]
Sugita et al.

[11] Patent Number: 4,992,711
[45] Date of Patent: Feb. 12, 1991

[54] POSITIONING CONTROLLING DEVICE

[75] Inventors: Kazuhiko Sugita, Anjo; Norio Sakakibara, Kariya; Nobumitsu Hori, Ichinomiya; Yoichi Yamakawa, Kariya, all of Japan

[73] Assignee: Toyoda Koki Kabushiki Kaisha, Kariya, Japan

[21] Appl. No.: 480,155

[22] Filed: Feb. 12, 1990

[30] Foreign Application Priority Data

Feb. 17, 1989 [JP] Japan .................................. 1-39111

[51] Int. Cl.$^5$ .............................................. G06F 3/14
[52] U.S. Cl. .................................... 318/561; 318/600; 318/571; 318/572; 318/573; 364/726; 364/822
[58] Field of Search ................. 318/560–640; 364/576, 726, 474.28–474.36, 827, 822, 826, 724.1

[56] References Cited

U.S. PATENT DOCUMENTS

| 4,084,255 | 4/1978 | Casasent et al. | 364/822 X |
| 4,477,878 | 10/1984 | Cope | 364/726 |
| 4,527,101 | 7/1985 | Zavis et al. | 364/726 X |
| 4,788,481 | 11/1988 | Niwa | 318/600 |
| 4,866,360 | 9/1989 | Kolomeets et al. | 318/600 X |

Primary Examiner—Bernard Roskoski
Assistant Examiner—Paul Ip
Attorney, Agent, or Firm—Oblon, Spivak, McClelland, Maier & Neustadt

[57] ABSTRACT

A positioning controlling device for improving the machining accuracy of a work of a non-circular shape. A control axis is driven in accordance with an input function consisting of position instruction data corresponding to a machining shape of a work, and a response function of the position of the control axis is measured actually. Then, a transfer function of the servo system is determined from Fourier transformation of the input function and Fourier transformation of the response function, and a corrected input function with which a response function of the control axis ideally corresponds to the machining shape of the work is obtained from the transfer function. Even if the control axis is driven in accordance with the corrected input function, a response function obtained does not correspond to the ideal machining shape of the work. Therefore, the calculations for obtaining an input function described above are sequentially executed until a response function obtained converges to the ideal machining shape. As a result, even if the servo system has a non-linearity, if the control axis is controlled in accordance with an input function finally obtained in this manner, then a response function then corresponds to the ideal machining shape.

5 Claims, 6 Drawing Sheets

POSITIONING CONTROLLING DEVICE

BACKGROUND OF THE INVENTION

This invention relates to a positioning controlling device which improves the follow-up accuracy and so forth of a positioning servo system.

In a numerically controlled machine tool, a position of a tool and a rotational position of a work are controlled by a servo system which employs servomotors. When a work is machined into a non-circular shape, target positions of such movable members are instructed momentarily. Instruction values of the target positions which vary with respect to time provide input functions of the servo system. Meanwhile, actual positions of the movable members which vary with respect to time in response to such instruction values provide response functions of the servo system.

Actually, since the response function is not equal to the input function, even if the input function is set in accordance with an ideal machining shape of a work, an actual finish shape is not equal to a preset machining shape. Therefore, such measures are taken that a transfer function of the servo system is measured and, taking such transfer function into consideration, the input function is calculated reversely so that the response function may correspond to a machining shape.

The transfer function of the positioning servo system is measured in such a manner as illustrated in FIG. 6. A white noise is inputted to the positioning servo system, and a spectrum analysis of a response function thus measured is carried out to measure the transfer function. Or else, a sine function of a certain frequency having a fixed magnitude is inputted to the positioning servo system, and a magnitude and a phase of a response function then are measured. Such measurement is carried out while varying the frequency of the sine function to find out the transfer function. A servo analyzer is employed as a device for carrying out such spectrum analysis to find out such a transfer function of a servo system as described above.

However, a positioning servo system has, in a mechanical system, a non-linearity arising from sliding friction, and in an electric system, a non-linearity originating in an analog element or the like employed in a servo amplifier, a digital to analog converter or the like. Accordingly, even if a sine function of a fixed frequency is used as an input function in a servo system, a magnitude and a phase of a response function will vary in accordance with a magnitude of the input function. In other words, a transfer function of a servo system varies depending upon levels of frequency components of an input function.

Accordingly, a transfer function of a servo system wherein individual frequency components are measured with an input function fixed to a predetermined level as in a prior art arrangement does not really represent a transfer function of the servo system with respect to an input function upon working when the level is different for the individual frequency components. Consequently, even if the input function is corrected with the transfer function, the response function does not ideally correspond to a machining shape of a work. Accordingly, the prior art technique has a problem that a sufficiently high degree of machining accuracy cannot be attained.

SUMMARY OF THE INVENTION

Accordingly, it is a first object of the present invention to improve the positioning accuracy of a servo system.

It is a second object of the present invention to improve the positioning accuracy of a servo system to improve the machining accuracy of a work of a non-circular shape to be machined by a numerically controlled machine tool.

It is a third object of the present invention to improve the machining accuracy of a cam, a piston of an internal combustion engine, and so forth.

In accordance with the present invention, a target instruction value of a movable member which varies with respect to time is calculated as an input function of a servo system in accordance with a machining shape of a work. Then, the servo system is driven in accordance with the input function while an actual position of the movable member which varies with respect to time is measured as a response function. The input function and response function are both Fourier transformed, and a transfer function of the servo system is determined from the Fourier transformation functions.

Meanwhile, a Fourier transformation function of an ideal response function for machining a work into a target machining shape is determined. A corrected Fourier transformation function of the input function is calculated from the Fourier transformation function of the ideal response function and the calculated transfer function of the servo system. The Fourier transformation function is inversely Fourier transformed to find out a corrected input function. Then, the servo system is driven in accordance with the corrected input function, and an actual response function is measured further. The response function is compared with the ideal response function. If a deviation between the measured response function and the ideal response function is smaller than an allowable value, then a work is actually machined in accordance with the corrected input function.

On the contrary if the deviation between the measured response function and the ideal response function is greater than the allowable value, then a new transfer function of the servo system corresponding to the corrected input function and another new corrected input function are calculated using the method described above. Then, the servo system is driven in accordance with the new corrected input function, and an actual response function is measured and a deviation of the response function from the ideal response function is determined further again.

A calculation will be carried out repetitively until the deviation between a measured response function and the ideal response function becomes smaller than the allowable value in this manner. As a result of such repetitive calculation, the actual response function converges to the ideal response function, and an input function corresponding to the ideal response function is determined.

In this manner, according to the present invention, since an input function corresponding to a machining shape is repetitively corrected using a transfer function which corresponds to the input function, a response function corresponding to the corrected input function is proximate to an ideal response function.

DESCRIPTION OF THE INVENTION

In the following, the present invention will be described in connection with a preferred embodiment thereof.

Figure 1:
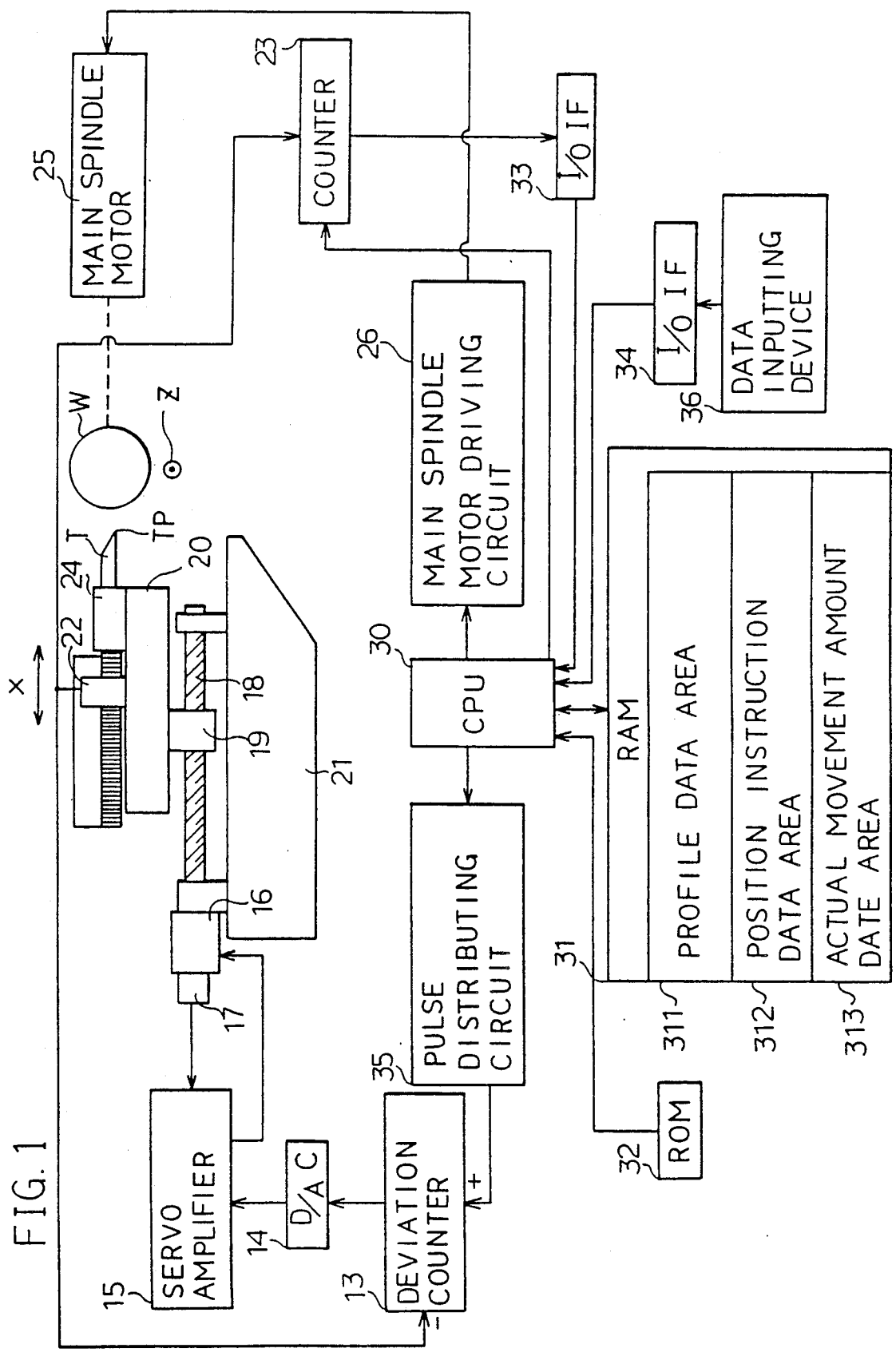
FIG. 1 is a diagram showing a positioning controlling device of a preferred embodiment of the present invention and a servo system in which the positioning controlling system is incorporated.

Referring to FIG. 1, a ball screw 18 is supported for rotation on a bed 21 of a numerically controlled machine tool. The ball screw 18 is driven to rotate by a servomotor 16. A nut 19 is securely mounted on a tool slide 20 and held in threaded engagement with the ball screw 18. A tool post 24 is securely mounted on the tool slide 20, and a tool (cutting tool) T is held on the tool post 24. Meanwhile, a post-shaped work W is supported for rotation on a main spindle not shown and rotated by a main spindle motor 25. When the tool slide 20 is moved, the tool T is moved back and forth in a direction of an X-axis perpendicular to an axis Z of the main spindle in a synchronized relationship with rotation of the work W, thereby machining the work W into a non-circular shape. The position of the tool slide 20 is detected by a linear scale 22 while the position of an end TP of the tool T in the X-axis direction is detected by correction of the position of the tool slide 20 by a predetermined amount.

The servomotor 16 is driven by a servo amplifier 15 to which an output of a digital to analog converter 14 is inputted, and an output of a deviation counter 13 is inputted to the digital to analog converter 14. A tachometer generator 17 is disposed for detecting a speed of rotation of the servomotor 16, and an output of the tachometer generator 17 is inputted to the servo amplifier 15 for the feedback control of the speed of the servomotor 16. A pulse signal outputted from the linear scale 22 is inputted as a position feedback signal to the deviation counter 13 while a position instructing pulse is inputted to the deviation counter 13 from a pulse distributing circuit 35. Further, a pulse signal outputted from the linear scale 22 is inputted to a counter 23 to measure an actual position of an end TP of the tool T. The main spindle motor 25 is controlled by a main spindle motor driving circuit 26 having a similar construction to that of a driving circuit (13, 14, 15, 17 and 35) for the servomotor 16.

Meanwhile, a RAM 31, a ROM 32, a pair of input/output interfaces 33 and 34 and the pulse distributing circuit 35 are connected to a CPU 30 which constitutes a numerically controlling device. The ROM 32 has a control program stored therein which defines a processing procedure of the CPU 30. The RAM 31 has formed therein a profile data area 311 in which profile data which define a machining shape of a work are to be stored, a position instruction data area 312 for the instruction of a position of the tool end TP which varies with respect to time, and an actual movement amount data area 313 for storing a measured actual position of the tool end TP which varies with respect to time.

An output signal of the counter 23 is inputted to the input/output interface 33 while a data inputting device 36 for inputting various kinds of data is connected to the input/output interface 34.

Profile data represent a relationship between an angle $\theta$ of rotation of a work and a relative position $\Delta XT(\theta)$ of a position of the tool end TP with respect to a predetermined reference position Xs. From the profile data, position instruction data constituted from an array of data which instruct target positions of the tool end TP with respect to time are determined, and the thus determined position instruction data are stored into the position instruction data area 312. The position instruction data are an array of data with regard to time and can be regarded as an array of sampled values of an input function $f_1(t)$ to the servo system. Accordingly, the position instruction data will be hereinafter represented with a functional mark of $f_1(t)$ similarly to the input function.

When the tool end TP is to be moved in accordance with the position instruction data $f_1(t)$, the position instruction data $f_1(t)$ stored in the position instruction data area 312 are successively outputted at a predetermined time interval to the pulse distributing circuit 35 by the CPU 30. Then, the pulse distributing circuit 35 outputs an instructed number of pulses for moving the tool end TP at an instructed speed to an instructed target position in an instructed period to the deviation counter 13. Since feedback pulses are inputted for the subtraction to the deviation counter 13 in response to movement of the tool end TP, the output of the deviation counter 13 exhibits a follow-up error then. An error signal outputted from the deviation counter 13 makes a velocity signal to the servomotor 16. An error signal outputted from the deviation counter 13 is inputted to the digital to analog converter 14 and converted into an analog error signal by the latter. Then, such error signal is amplified by the servo amplifier 15 and applied to the servomotor 16. Consequently, the servomotor 16 is rotated, and the nut 19 is moved by rotation of the ball screw 16 connected to the shaft of the servomotor 16. The tool slide 20 is moved by such movement of the nut 20

A pulse signal is outputted from the linear scale 22 in response to movement of the tool end TP and counted by the counter 23. The counter 23 is initialized to zero when the tool end TP is indexed to its original position. Accordingly, an amount of movement of the tool end TP from the original position is detected from an output of the counter 23.

The CPU 30 reads a value of the counter 23 to obtain actual movement amount data which make an array of data indicative of actual positions of the tool end TP. Such measured actual movement amount data are stored into the movement amount data area 313. The movement amount data are an array of data with respect to time and can be regarded as an array of sampled value of a response function $g_1(t)$ of the servo system. Accordingly, the actual movement amount data will be hereinafter represented with a functional mark of $g_1(t)$ similarly to the response function.

Figure 2:
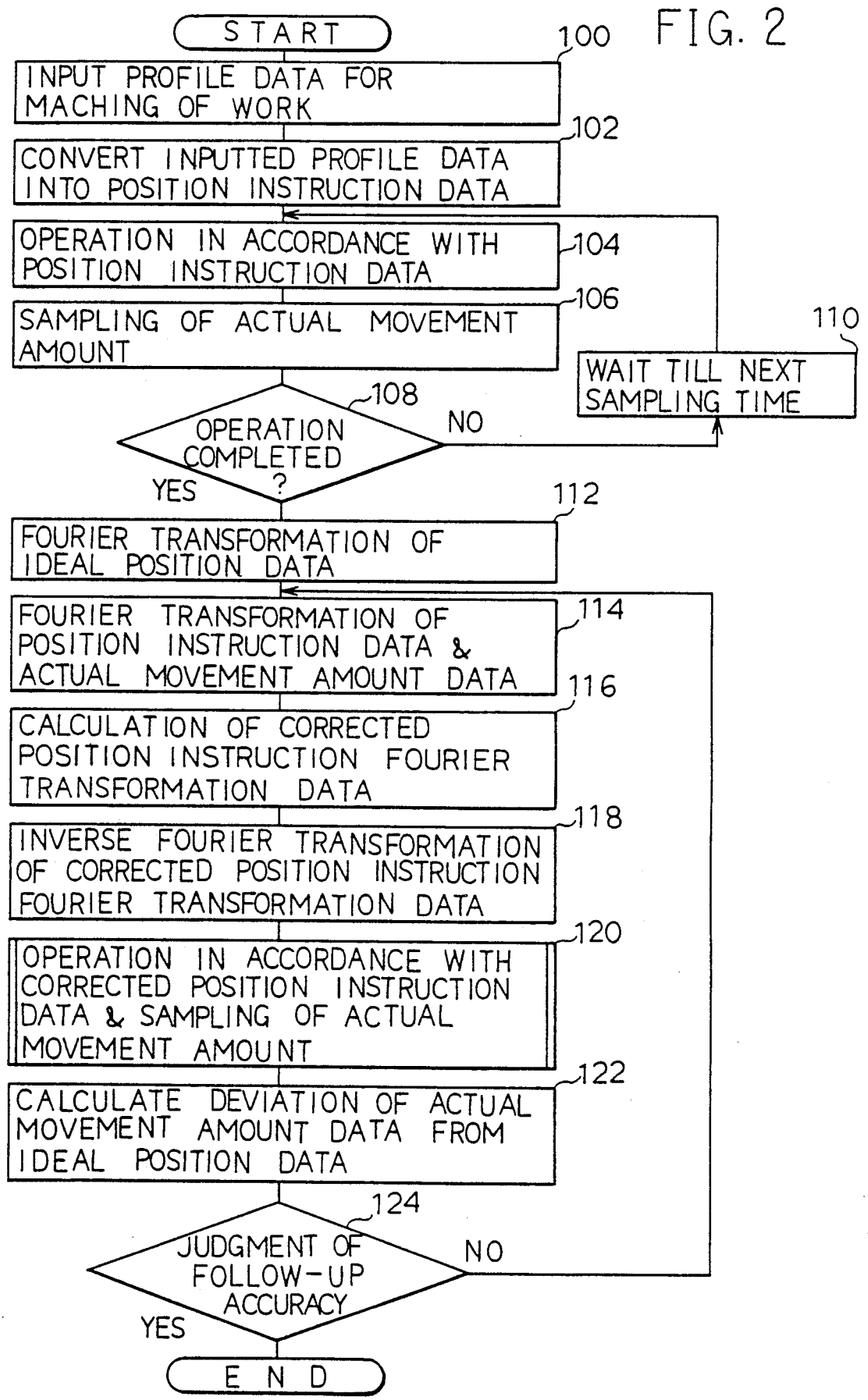
FIG. 2 is a flow chart showing a processing procedure of a CPU shown in FIG. 1.

Subsequently, a processing procedure of the CPU 30 used in the positioning controlling device of the present invention will be described with reference to the flow chart of FIG. 2.

In the present device, at first trial cutting is carried out repetitively to obtain final corrected position instruction data in accordance with which main cutting is to be carried out.

Figure 3:
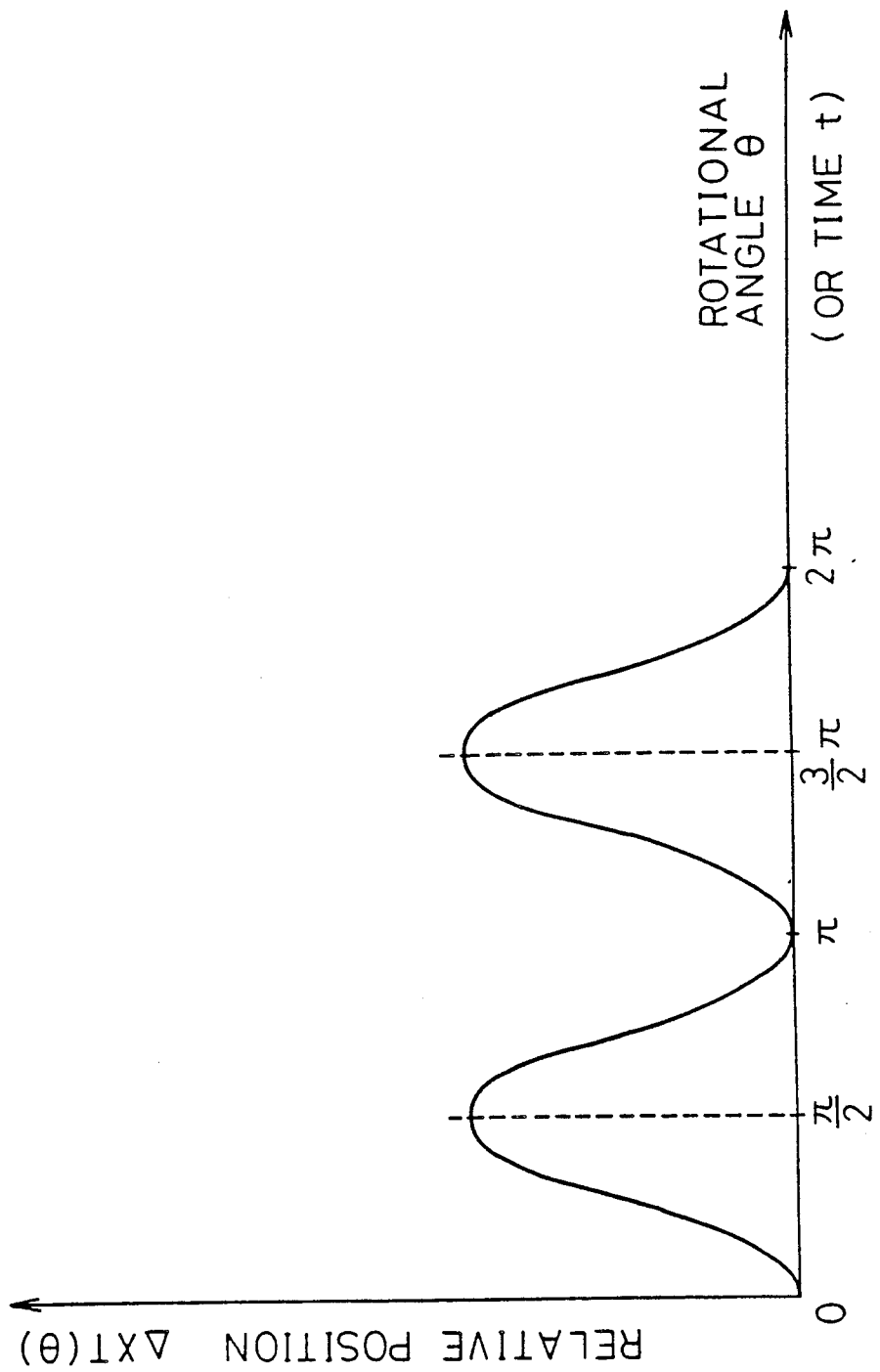
FIG. 3 is a characteristic view showing a curve obtained by plotting profile data.
Figure 4:
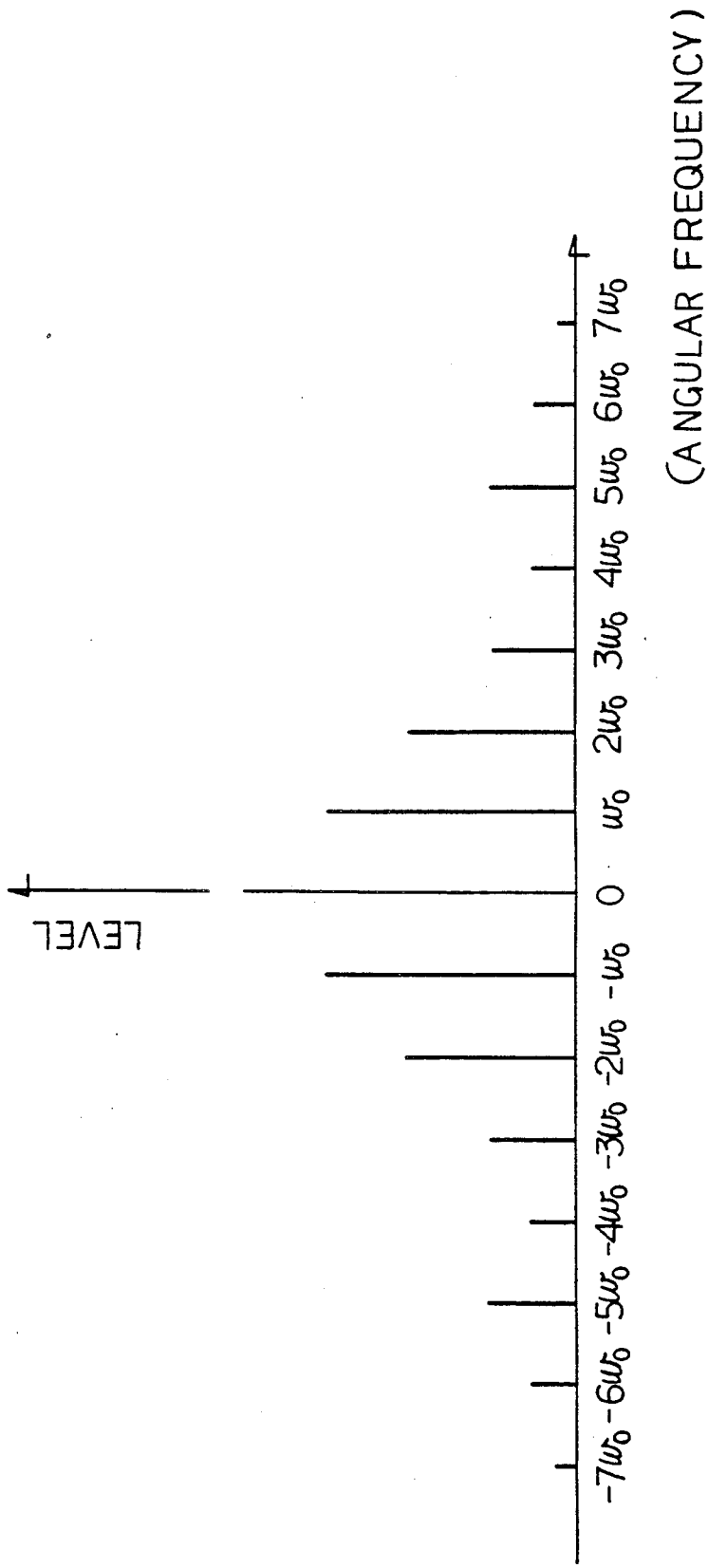
FIG. 4 is a schematic view illustrating an outline of Fourier transformation data.
Figure 5:
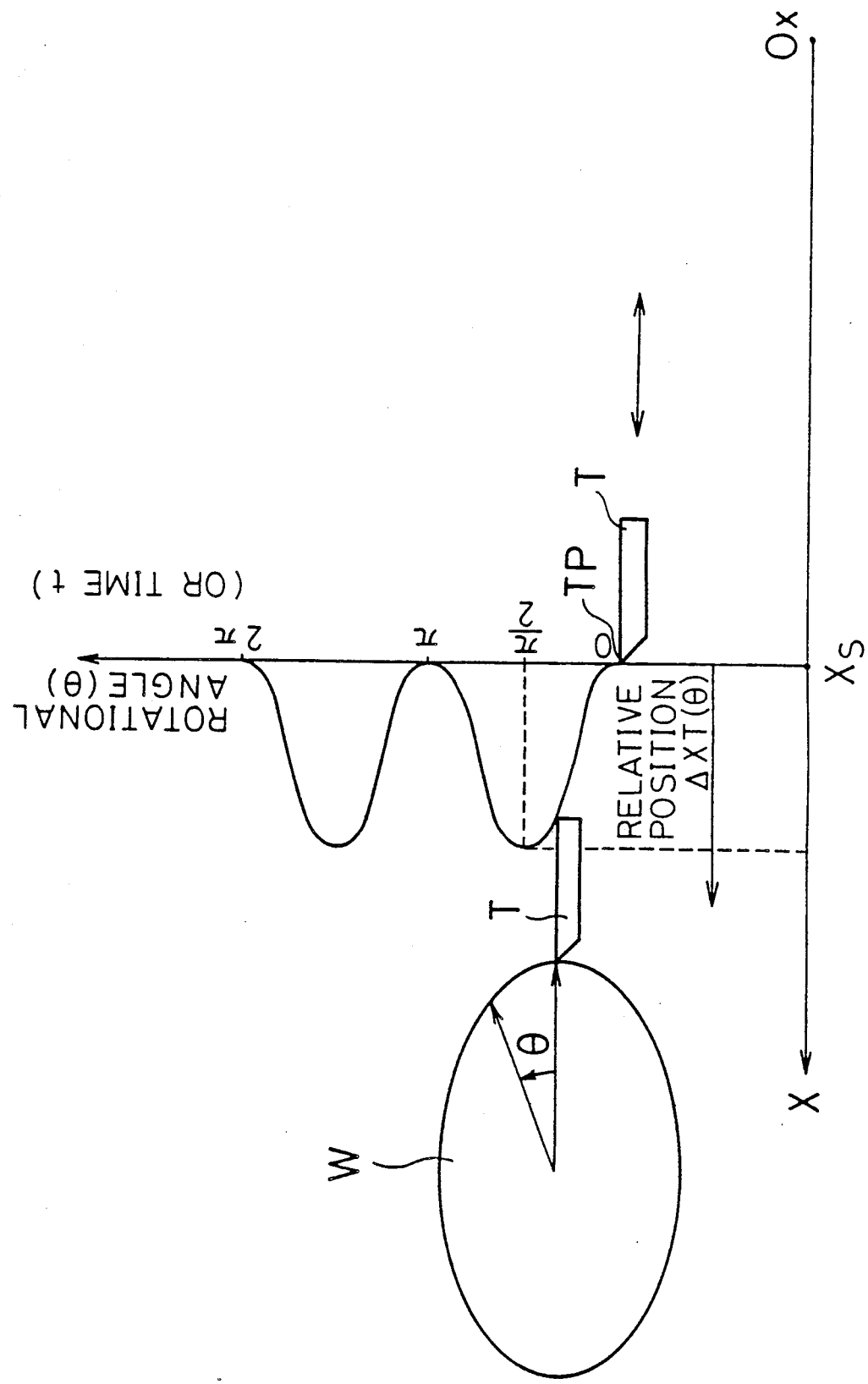
FIG. 5 is a characteristic view showing a locus of movement of a tool.
Figure 6:
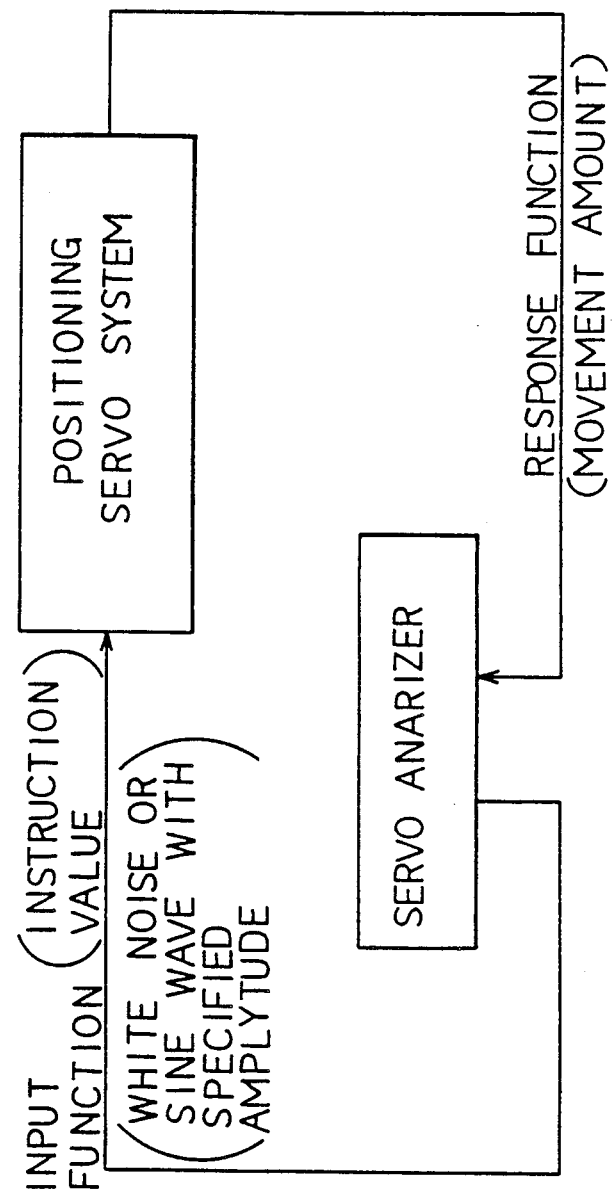
FIG. 6 is a block diagram illustrating a conventional method of measuring a transfer function of a servo system.

At step 100, profile data in accordance with which a work is to be machined are inputted from the data inputting device 36 and stored into the profile data area 311 of the RAM 31. Plotting of the profile data $\Delta XT(\theta)$ provided for each 0.5 degrees of an angle of rotation will make such a curve as shown in FIG. 3 with respect to an angle $\theta$ of rotation of a work W.

Then at step 102, the profile data $\Delta XT(\theta)$ inputted at step 100 are converted into position instruction data $f_1(t)$ of an input function taking a rotational speed $\omega_0$ of the work into consideration and are stored into the position instruction data area 312. Due to a relationship of $\omega = \omega_0 t$, $f_1(t) = \Delta XT(\omega_0 t)$.

An initial value of the position instruction data $f_1(t)$ is, in the present embodiment, equal to ideal position data $r(t)$ which are an ideal response function which represents a position of the tool end TP for accurately machining the work into a predetermined machining shape. The step 102 constitutes an ideal position data calculating means and an initializing means.

Subsequently, the current process of the CPU 30 advances to step 104 at which instruction data for rotating the main spindle motor 25, i.e. the workpiece W at a constant speed are outputted to the driving circuit 26 and the position instruction data $f_1(t)$ are successively outputted at a fixed time interval to the pulse distributing circuit 35. Consequently, the tool end TP makes instructed back and forth movement in the X-axis direction in a synchronized relationship with rotation of the work W.

Then at step 108, it is judged whether or not the instructions of a series of steps of movement have been completed, and in case they are not completed yet, the process advances to step 110. At step 110, execution of the process of the CPU 30 is deferred to a next sampling time, and then the process returns to steps 104 and 106 to execute outputting of position instruction data at the sampling time and reading of actual movement amount data. Then, if it is judged at step 108 that the machining movement is completed, the process advances to step 112.

At step 112, ideal position data $r(t)$ which are an ideal response function are Fourier transformed to obtain ideal position Fourier transformation data $R(j\omega)$ of a frequency function. The step 112 constitutes a third Fourier transformation processing means.

Subsequently, the process advances to step 114 at which position instruction data $f_1(t)$ of a time function stored in the position instruction data area 312 are Fourier transformed to obtain position instruction Fourier transformation data $F_1(j\omega)$ of a frequency function. Similarly, actual movement amount data $g_1(t)$ of a time function stored in the actual movement amount data area 313 are Fourier transformed to obtain actual movement amount Fourier transformation data $G_1(j\omega)$ of a frequency function. The step 114 constitutes a first Fourier transformation processing means and a second Fourier transformation processing means. Such Fourier transformations are executed using a well known technique of fast Fourier transformation (FFT).

It is to be noted that, since the position instruction data $f_1(t)$, actual movement amount data $g_1(t)$ and ideal position data $r(t)$ described above are periodic functions of a frequency $\omega_0$ ($\omega_0$ is a angular frequency of rotation of a work), the ideal position Fourier transformation data $R(j\omega)$, position instruction Fourier transformation data $F_1(j\omega)$ and actual movement amount Fourier transformation data $G_1(j\omega)$ are discrete functions which have values only at angular frequencies of $n \times \omega_0$ (n is an integer).

In particular, the following expressions are obtained.

$$R(j\omega) = \sum_{n=-\infty}^{\infty} R_n \cdot \text{EXP}(j\Phi_{Rn}) \cdot \delta(\omega - n \cdot \omega_0) \quad (1)$$

$$F_1(j\omega) = \sum_{n=-\infty}^{\infty} F_{1n} \cdot \text{EXP}(j\Phi_{F1n}) \cdot \delta(\omega - n \cdot \omega_0) \quad (2)$$

$$G_1(j\omega) = \sum_{n=-\infty}^{\infty} G_{1n} \cdot \text{EXP}(j\Phi_{G1n}) \cdot \delta(\omega - n \cdot \omega_0) \quad (3)$$

where $R_n$, $F_{1n}$ and $G_{1n}$ are real numbers representative of levels of individual line spectra, and $\Phi_{Rn}$, $\Phi_{F1n}$ and $\Phi_{G1n}$ are phases of the individual line spectra. Meanwhile, $\delta(\omega - n \cdot \omega_0)$ is a $\delta$ function and is equal to 1 when $\omega = n \cdot \omega_0$ but equal to 0 when $\omega \neq n \cdot \omega_0$.

On the other hand, if a transfer function of the servo system which corresponds to the position instruction data $f_1(t)$ which are an input function is $Z_1(j\omega)$, then the following expression stands.

$$G_1(j\omega) = Z_1(j\omega) F_1(j\omega) \quad (4)$$

Accordingly, $$Z_1(j\omega) = G_1(j\omega)/F_1(j\omega) \quad (5)$$

Subsequently, using the transfer function $Z_1(j\omega)$, corrected position instruction data $f_2(t)$ which are an input function with which a response function of the servo system is to be provided by the ideal position data $r(t)$ are found out.

A transfer function $Z_2(j\omega)$ of the servo system when the corrected position instruction data $f_2(t)$ are an input function is unknown. However, it can be presumed that such transfer function $Z_2(j\omega)$ is approximately equal to the transfer function $Z_1(j\omega)$. Accordingly, it is reasonable to presume that the following expression which is approximately similar to the expression (4) above stands when data obtained by Fourier transformation of the corrected position instruction data $f_2(t)$ are corrected position instruction Fourier transformation data $F_2(j\omega)$.

$$R(j\omega) = Z_1(j\omega) \cdot F_2(j\omega) \quad (6)$$

Accordingly, the following expression stands.

$$F_2(j\omega) = R(j\omega)/Z_1(j\omega) \quad (7)$$

Substituting the expression (5) into the expression (7), the following expression is obtained.

$$F_2(j\omega) = R(j\omega) \cdot F_1(j\omega)/G_1(j\omega) \quad (8)$$

Substituting the expressions (1), (2) and (3) into the expression (8), the expression (10) is obtained taking a characteristic of the expression (9) of a $\delta$ function into consideration.

$$\delta(\omega - n \cdot \omega_0) \cdot \delta(\omega - m \cdot \omega_0) = \begin{cases} 1 & \text{(when } n = m\text{)} \\ 0 & \text{(when } n \neq m\text{)} \end{cases} \quad (9)$$

$$F_2(j\omega) = \qquad (10)$$

$$\sum_{n=-\infty}^{\infty} \frac{R_n \cdot \text{EXP}(j\Phi_{Rn}) \cdot F_{1n} \cdot \text{EXP}(j\Phi_{F1n})}{G_{1n} \cdot \text{EXP}(j\Phi_{G1n})} \delta(\omega - n \cdot \omega_0) =$$

$$\sum_{n=-\infty}^{\infty} (R_n \cdot F_{1n}/G_{1n})\text{EXP}(j(\Phi_{Rn} +$$

$$\Phi_{F1n} - \Phi_{G1n}))\delta(\omega - n \cdot \omega_0)$$

The corrected position instruction Fourier transformation data $F_2(j\omega)$ make a large number of line spectra as apparently seen from the expression (10) above.

In the meantime, $F_2(j\omega)$ is represented in an expression (11) below similarly to the expression (2) above.

$$F_2(j\omega) = \sum_{n=-\infty}^{\infty} F_{2n} \cdot \text{EXP}(j\Phi_{F2n}) \cdot \delta(\omega - n \cdot \omega_0) \quad (11)$$

From the expression (10) and (11) above, general expressions $$F_{2n} = R_n \cdot F_{1n} G_{1n} \quad (12)$$

$$\Phi_{F2n} = \Phi_{Rn} + \Phi_{F1n} - \Phi_{G1n} \quad (13)$$

are obtained.

At step 116, corrected position instruction Fourier transformation data $F_2(j\omega)$ are calculated in accordance with the expressions (12), (13) and (11).

Subsequently at step 118, the corrected position instruction Fourier transformation data $F_2(j\omega)$ are inversely Fourier transformed in accordance with an expression (14) below.

$$f_2(t) = \sum_{n=-\infty}^{\infty} F_{2n} \cdot \text{EXP}(j\Phi_{F2n}) \cdot \text{EXP}(jn\omega_0 t) \quad (14)$$

It is to be noted that, since $f_2(t)$ is a real variable function, the expressions $$F_{2n} = F_{2-n}, \Phi_{F2n} = -\Phi_{F2-n}$$

stand, and besides, $f_2(t)$ can be developed into such a cosine function as given by an expression (15) below.

$$f_2(t) = \sum_{n=-\infty}^{\infty} 2F_{2n}\cos(n\omega_0 t + \Phi_{F2n}) \quad (15)$$

At step 120 after the corrected position instruction data $f_2(t)$ have been obtained as a time function in this manner, the servomotor 16 is driven in accordance with the corrected position instruction data $f_2(t)$ in a similar manner as in the processes at steps 104, 106, 108 and 110 while an actual amount of movement of the servomotor 16 is measured. Thereupon, measured actual movement amount data $g_2(t)$ are stored into the actual amount data area 313.

Then, the process advances to step 122 at which a deviation $E(t)$ of the actual amount data $g_2(t)$ from the ideal position data $r(t)$ is calculated in accordance with an expression (16) below.

$$E(t) = g_2(t) - r(t) \quad (16)$$

Subsequently at step 124, the deviation $E(t)$ and an allowable value M of the machining shape are compared with each other in accordance with an expression (17) below.

$$|E(t)| \leq M \quad (17)$$

An error evaluating means is realized by those steps 122 and 124.

If the expression (17) stands for all values of t, then the corrected position instruction data $f_2(t)$ are data for the position instruction upon actual machining.

If the expression (17) does not stand, then the analysis of the step 114 and so forth is repeated using $f_2(t)$ as an input function and $g_2(t)$ as a response function. Then, at step 118, new corrected position instruction data $f_3(t)$ are found out, and then at step 120, the servomotor 16 is driven in accordance with the obtained corrected position instruction data $f_3(t)$ while actual movement amount data $g_3(t)$ are measured. Then at step 122, a deviation $g_3(t)$ of the actual movement amount data $g_3(t)$ from the ideal position data $r(t)$ is calculated, and at step 124, evaluation of the deviation $E(t)$ is executed. Then, if the deviation $E(t)$ is greater than the allowable value M, then the process returns to step 114 again to repeat execution of a similar analysis. Corrected position instruction data $f_k(t)$ are successively calculated in this manner.

It is to be noted that, with regard to $f_k(t)$, an expression (18) below stands similarly to the expression (15) above.

$$f_k(t) = \sum_{n=0}^{\infty} 2F_{kn}\cos(n\omega_0 t + \Phi_{Fkn}) \quad (18)$$

Further, with regard to $F_{kn}$ and $\Phi_{Fkn}$, expressions (19) and (20) stand.

$$F_{kn} = R^{k-1}{}_n F_{1n}/(G_{1n} \cdot G_{2n} \cdot \ldots G_{k-1\,n}) \quad (19)$$

$$\Phi_{Fkn} = k\Phi_{Rn} - (\Phi_{G1n} + \ldots + \Phi_{G_{k-1\,n}}) \quad (20)$$

However, there is no inevitability that the initial function $f_1(t)$ of the input function must coincide with the ideal response function $r(t)$.

A correcting calculation of the input function $f_k(t)$ is repetitively executed until the response function $g_k(t)$ converges to the ideal function $r(t)$ in this manner. As a result, the follow-up error which may be caused by a nonlinearity of the positioning servo system can be minimized.

While in the foregoing description positioning control of a tool is described where the tool is the movable member and a tool feed shaft is the control axis, the present invention can be used similarly for the control of an angle of rotation of the main spindle. Further, the present invention can be applied for the positioning control by a common servo system.

We claim:

1. A positioning controlling device, comprising:
   a position instruction data storage means for storing therein position instruction data for successively instructing the position of a movable member which is controlled by a control axis of a numerically controlled machine tool for machining a work into a non-circular shape, the position of said movable member being variable with respect to time,
   a first Fourier transformation processing means for Fourier transforming the position instruction data stored in said position instruction data storage means to obtain position instruction Fourier transformation data, a movement amount detecting means for operating said control axis in accordance with the position instruction data to successively detect an actual amount of movement of said movable member which varies with respect to time as movement amount data, a second Fourier transformation processing means for Fourier transforming the actual movement amount data detected by said position detecting means to obtain actual movement amount Fourier transformation data, a correcting means for obtaining corrected position instruction Fourier transformation data from the position instruction Fourier transformation data calculated by said first Fourier transformation processing means, the actual movement amount Fourier transformation data calculated by said second Fourier transformation processing means and ideal position Fourier transformation data calculated from an ideal position which should be assumed by said movable member and which varies with respect to time, and an inverse Fourier transformation processing means for inversely Fourier transforming the corrected position instruction Fourier transformation data calculated by said correcting means to obtain corrected position instruction data.

2. A positioning controlling device according to claim 1, further comprising an error evaluating means for comparing the actual movement amount data with the ideal position data to evaluate an error therebetween.

3. A positioning controlling device according to claim 2, further comprising a sequential calculation instructing means for repetitively instructing, when the error by said error evaluating means is greater than an allowable value, a cycle of calculations of storing corrected position instruction data obtained by said inverse Fourier transformation processing means as new position instruction data into said position instruction data storage means, driving said control axis in accordance with the new position instruction data to obtain further new corrected position instruction data and evaluating an error of the further new corrected position instruction data until the error by said error evaluating means becomes smaller than the allowable value, said sequential calculation instructing means stopping, when the error becomes smaller than the allowable value as a result of such repetitive calculations, the sequential calculations to determine corrected position instruction data then as formal position instruction data for machining the work.

4. A positioning controlling device according to claim 3, further comprising an initial value setting means for adopting the ideal position as an initial value of the position instruction data of the repetitive calculations.

5. A positioning controlling device according to claim 1, wherein said correcting means obtains the corrected position instruction Fourier transformation data in accordance with an expression $$F_2(j\omega) = R(j\omega) \cdot F_1(j\omega) / G_1(j\omega)$$

where $F_2(j\omega)$, $R(j\omega)$, $F_1(j\omega)$ and $G_1(j\omega)$ are complex representations of the corrected position instruction Fourier transformation data, ideal position Fourier transformation data, position instruction Fourier transformation data and actual movement amount Fourier transformation data, respectively.

* * * * *